(12) United States Patent
Chung et al.

(10) Patent No.: US 7,797,177 B2
(45) Date of Patent: Sep. 14, 2010

(54) INTEGRATED DECISION SUPPORT FRAMEWORK FOR COLLABORATIVE PRODUCT DEVELOPMENT

(75) Inventors: Jack C. H. Chung, Cincinnati, OH (US); Jia-Yi Wang, Mason, OH (US); Chien-Tai Wu, Cincinnati, OH (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 2937 days.

(21) Appl. No.: 10/055,098

(22) Filed: Jan. 22, 2002

(65) Prior Publication Data

US 2003/0139954 A1     Jul. 24, 2003

(51) Int. Cl.
    *G06F 9/44*        (2006.01)
    *G06F 17/50*     (2006.01)
(52) U.S. Cl. .......................................................... 705/7
(58) Field of Classification Search ...................... 705/7
See application file for complete search history.

(56) References Cited

U.S. PATENT DOCUMENTS

| | | | |
|---|---|---|---|
| 6,102,958 A * | 8/2000 | Meystel et al. ................. 703/2 |
| 6,826,541 B1 * | 11/2004 | Johnston et al. ........... 705/36 R |
| 6,853,920 B2 * | 2/2005 | Hsiung et al. ................... 702/1 |
| 6,983,237 B2 * | 1/2006 | Paterson et al. ............... 703/22 |
| 2002/0107824 A1 * | 8/2002 | Ahmed ......................... 706/46 |
| 2004/0215551 A1 * | 10/2004 | Eder ............................ 705/38 |

OTHER PUBLICATIONS

Meziane et al, Intelligent systems in manufacturing: current developments and future prospects, Integrated Manufacturing Systems v11n4, pp. 218-238, 2000, Dialog File 15.*

* cited by examiner

*Primary Examiner*—Andre Boyce
(74) *Attorney, Agent, or Firm*—Michael J. Wallace, Jr.

(57) ABSTRACT

According to one embodiment of the invention, a method for integrated decision support is disclosed. The method includes receiving decision inputs. The method also includes converting the received decision inputs to graph representations and mathematical representations. The method further includes decomposing the converted decision inputs to sub-problems. The method further includes detecting strongly-connected components associated with the sub-problems. The strongly-connected components represent the sub-problems that are coupled. The method further includes solving the sub-problems.

22 Claims, 3 Drawing Sheets

INTEGRATED DECISION SUPPORT FRAMEWORK FOR COLLABORATIVE PRODUCT DEVELOPMENT

TECHNICAL FIELD OF THE INVENTION

The present invention relates in general to product development management and, in particular, but not exclusively, to an integrated decision support framework for collaborative product development.

BACKGROUND OF THE INVENTION

Collaborative product development is a product development process in which the entire product development team (e.g., designers, engineers, customers, suppliers, business partners, etc.) can readily exchange information about the product throughout its entire life cycle. The collaborative product development process can encompass requirements definition, design and analysis, manufacturing planning, product data management, and collaborative commerce (enhanced business-to-business interaction and cooperation) for the product involved. Taking advantage of the enhanced flexibility and increased resources provided through collaborative product development processes, business entities can develop higher quality products than their competitors and deliver them to market faster.

Fundamental to quality improvement and increased productivity of collaborative product development processes is the need for an effective decision-making and propagation mechanism (vehicle for making and carrying out decisions). In collaborative product development, the inputs to and drivers of the decision-making part of the process (so-called "decision-drivers") are numerous and diverse. For example, automotive industry decision-drivers can include, but are not limited to, option selections (e.g., V8 versus V6 engine), equality relations (e.g., hole size=pin size+5 mm), dependencies (e.g., assemble part A before part B), production rules (e.g., if engine=V8, add fan), logical relations (e.g., product must contain either part A or parts B and C), conditional relations (e.g., if loading capacity>X, use roller bearing; or else, use ball bearing), inequality expressions (e.g., total cost<1000 dollars), and geometric constraints (e.g., two rows of seats must be 30 inches apart). In collaborative product development, such decision-drivers are inputs to the decision-making process that originate from numerous, diverse sources.

A significant problem with supporting the numerous, diverse types of decision-drivers in collaborative product development is that the different input drivers interact with each other and thus each one cannot be independently resolved. As such, there is no existing technique that can integrate these diverse input drivers and obtain an optimum solution in a way that violates no imposed constraints. Furthermore, in a practical industrial environment, a relatively large set of these input drivers (e.g., thousands) typically have to be addressed all at the same time. Consequently, a significant challenge in collaborative product development is to be able to formulate optimal decisions efficiently and resolve all conflicts in a reasonable way.

SUMMARY OF THE INVENTION

According to the present invention, disadvantages and problems associated with previous collaborative product development techniques have been substantially reduced or eliminated.

In one example embodiment of the present invention, an integrated decision support framework is provided, whereby among other things, mathematical constraints, logical relations, production rules, and dependencies in product development management systems can be integrated in the same framework to support new applications in variant product data management. In accordance with one example embodiment of the present invention, different types of decision-drivers from numerous sources can be converted into a unified decision network including, for example, both mathematical and node-edge graph representations. A graph-theoretic algorithm may be applied to the large problem (unified decision network) to detect and separate strongly-connected components. The strongly-connected components represent sub-problems that must be solved simultaneously. A dependency propagation technique may be used to properly order the sub-problems so they can be processed and solved sequentially and correctly. Each strongly-connected component (small sub-problem) can be delegated to a suitable decision generator depending on the types of relations included in the component. For example, a numerical solution algorithm may be used to solve the ordered, numerical relations sub-problems, an algebraic solution algorithm may be used to solve the ordered, geometric relations sub-problems, and a logical inference engine (algorithm) may be used to solve the ordered, logical relations sub-problems. Solutions thus derived can be propagated to the next stage of the decision resolution process until a complete problem is solved.

Particular embodiments of the present invention may provide one or more technical advantages. For example, certain embodiments of the present invention may provide an integrated decision support framework that can support diverse types of decision drivers to produce efficient decision-making and generate effective decision rationale. Certain embodiments of the present invention allow the diverse requirements generated throughout the product development cycle to be captured, managed, solved and propagated in a unified framework. As a result, users are freed from managing the complexity aspects of the problem and assuring the correctness of the solution. Instead, users are allowed to concentrate on their innovative activities and thus improve the overall productivity and quality of the product development process. The present invention's inherent capability of decomposing a large problem into a smaller sub-problems and organizing them into proper sequential order makes effective decision support of large industrial problems practical. As such, common tasks in product life cycle management, such as design configuration support, variant and diversity product structure, requirements-driven design, change and dependency management and propagation, and constraint-based design are all covered within the scope of the present invention. Also, the integrated decision support framework of the present invention can facilitate explanations of the decisions made, by providing decision rationale to illustrate how a particular decision is derived, what conflicts exist, and how to resolve them. This advantageous property is crucial in supporting human decision-making when trade-offs need to be made.

Other technical advantages of the present invention will be readily apparent to one skilled in the art from the following figures, description and claims.

BRIEF DESCRIPTION OF THE DRAWINGS

For a more complete understanding of the present invention and its advantages, reference is now made to the following descriptions, taken in conjunction with the accompanying drawings, in which.

DETAILED DESCRIPTION OF THE INVENTION

The preferred embodiment of the present invention and its advantages are best understood by referring to FIGS. 1-4 of the drawings, like numerals being used for like and corresponding parts of the various drawings.

Essentially, in accordance with one example embodiment of the present invention, an integrated decision support framework is provided, whereby different types of decision-drivers from numerous sources can be converted into a unified decision network including, for example, both mathematical and node-edge graph representations. A graph-theoretic algorithm may be applied to the large problem (unified decision network) to detect and separate strongly-connected components. The strongly-connected components represent sub-problems that must be solved simultaneously. A dependency propagation technique may be used to properly order the sub-problems so they can be processed and solved sequentially and correctly. Each strongly-connected component (small sub-problem) can be delegated to a suitable decision generator depending on the types of relations included in the component. For example, a numerical solution algorithm may be used to solve the ordered, numerical relations sub-problems, an algebraic solution algorithm may be used to solve the ordered, geometric relations sub-problems, and a logical inference engine (algorithm) may be used to solve the ordered, logical relations sub-problems. Solutions thus derived can be propagated to the next stage of the decision resolution process until a complete problem is solved.

Figure 1:
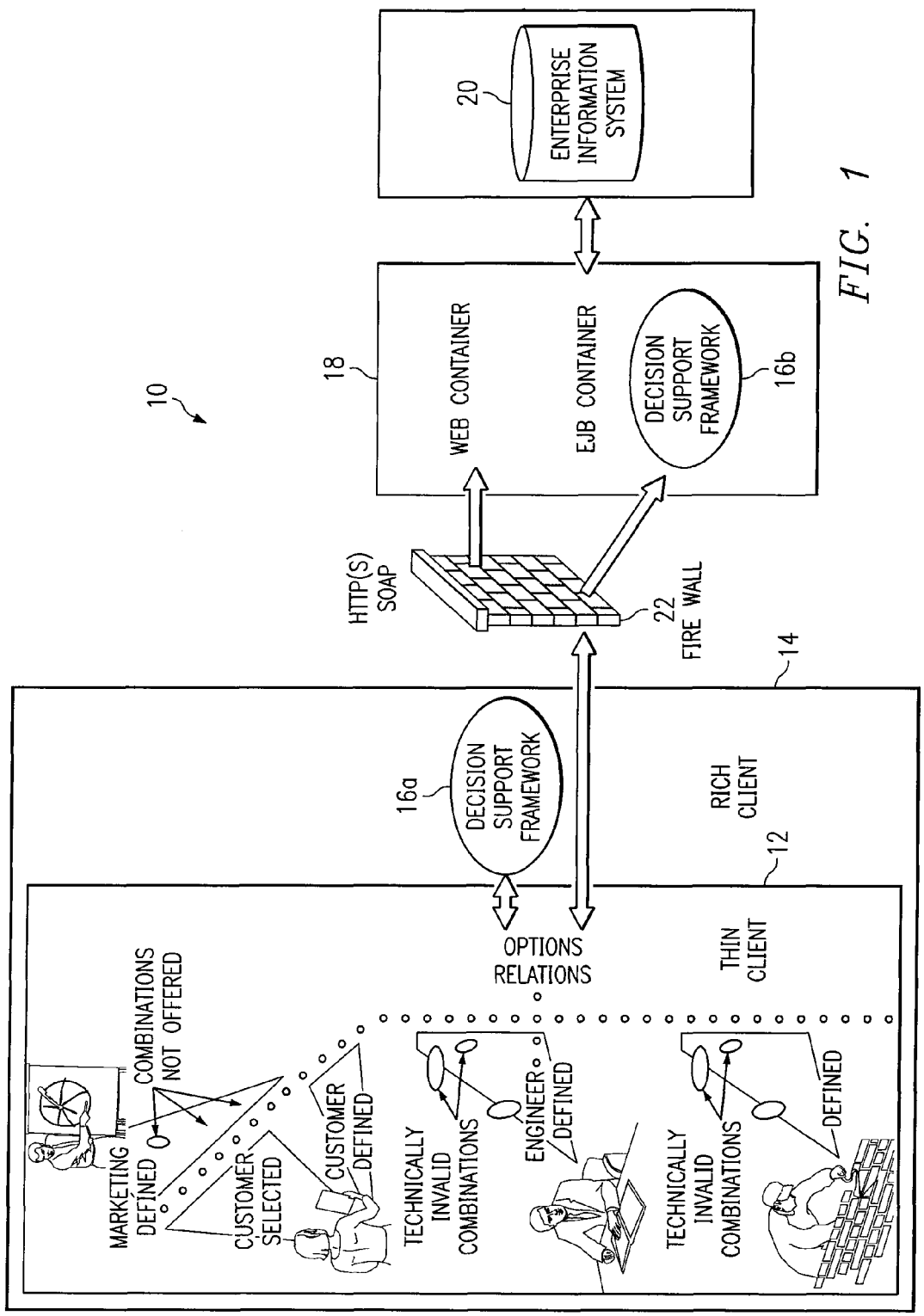
FIG. 1 illustrates an example system that may be used to implement one example embodiment of the present invention.

FIG. 1 illustrates an example system 10 that may be used to implement one example embodiment of the present invention. As shown by the example in FIG. 1, a suitable collaborative product development team can be defined for a particular product (e.g., marketing, customer, engineering, and supplier defined for the product involved). In that regard, such a team may be represented as the "client" associated with the product being developed (e.g., "thin" client 12 or "rich" client 14). In accordance with the present invention, different inputs (decision-drivers) for the decision-making process (e.g., options, relations, etc.) can be conveyed to an integrated decision support framework application 16a or 16b for resolution as an overall decision.

For example, a "thin" (limited resources available) client 12 may forward different decision-drivers for a collaborative product development process to integrated decision support framework application 16b at a remote location (e.g., through a firewall 22 to a server on the Internet 18). In such a case, integrated decision support framework application 16b may be software executed by a processor operated by a different entity than "thin" client 12. On the other hand, a "rich" (suitable resources available) client 14 may provide the different decision-drivers locally to integrated decision support framework application 16a for resolution as an overall decision. In such a case, a processor operated by "rich" client 14 may execute integrated decision support framework application 16a as software. In either event, an overall decision can be generated from the input decision-drivers by integrated decision support framework application 16a or 16b, and conveyed, for example, via the Internet 18 to a suitable repository (e.g., a database associated with enterprise information system 20) for use by appropriate enterprise entities.

Notably, decision-driver information or decision information may be communicated from a thin client 12 or rich client 14 to the Internet 18 using Hypertext Transport Protocol (HTTP), Simple Object Access Protocol (SOAP), Extensible Markup Language (XML), or any other suitable communication technique. On the other hand, instead of conveying decision-drivers or decisions via Internet 18 to integrated decision support framework application 16b or enterprise information system 20, any suitable network for conveying decision-driver information or overall decision information may be used. For example, network 18 may include any appropriate combination of public and/or private networks capable of conveying decision-driver information or decision information. Network 18 may also include any appropriate local area networks (LANs), metropolitan area networks (MANs), or wide area networks (WANs).

Figure 2:
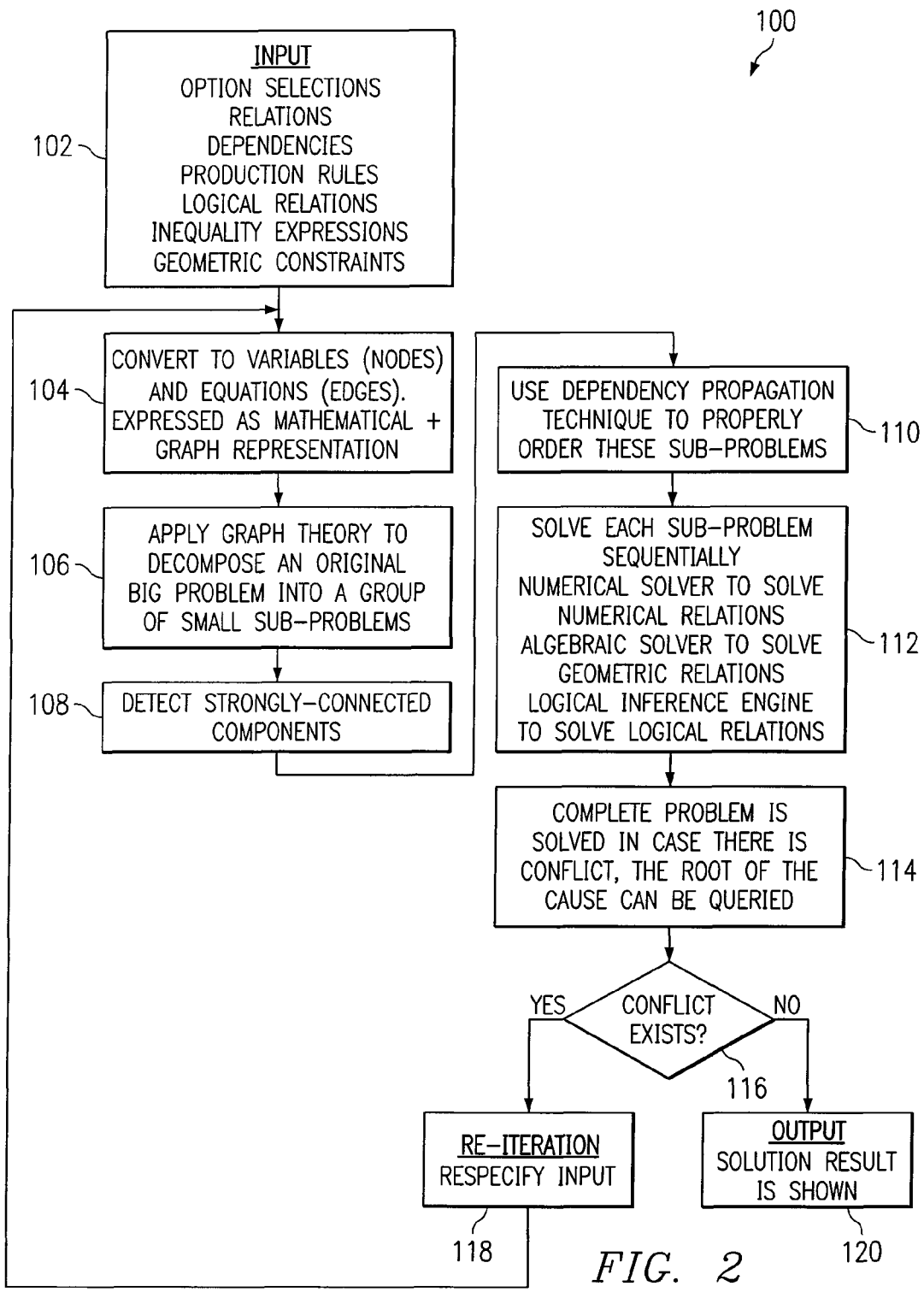
FIG. 2 illustrates an example method for integrated decision support that may be used to implement one example embodiment of the present invention.

FIG. 2 illustrates an example method 100 for integrated decision support that may be used to implement one example embodiment of the present invention. For example, method 100 may be a computer-executed software application used to implement an example integrated decision support framework application such as 16a or 16b in FIG. 1. At step 102, all diverse inputs (e.g., decision-drivers) for a product development process are received. For example, at step 102, some or all of (but not necessarily limited to) the following diverse types of input information may be received with respect to a collaborative product development process: option selections; linear relations; dependencies; production rules; logical relations; inequality expressions; geometric constraints; etc. At step 104, the received inputs can be converted into a unified decision network that can include both node-edge graph representations and mathematical representations of the received input information. By compiling these conversions and representations into a unified decision network (e.g., a unified set of inputs), all of the received inputs may be taken into account before an overall decision is derived.

Figure 3:
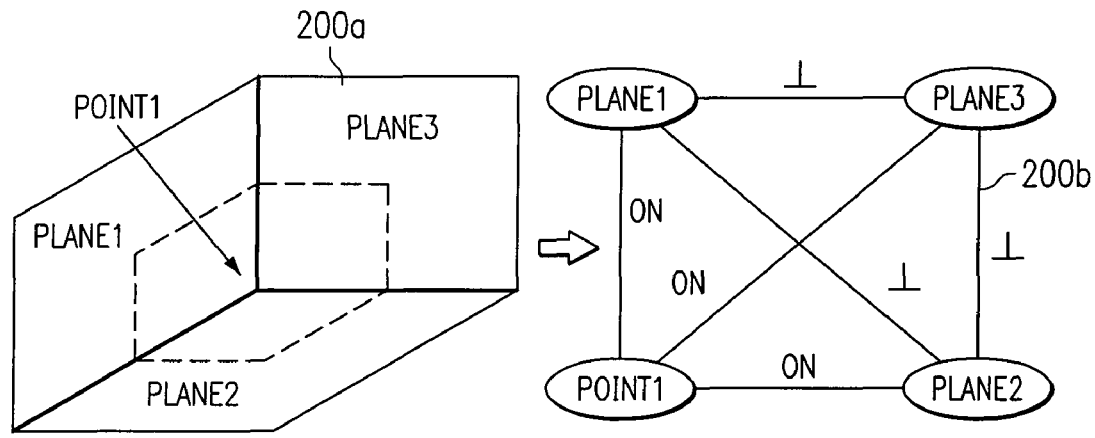
FIG. 3 illustrates how certain received decision inputs can be converted into node-edge graph representations.

FIG. 3 illustrates how certain of the received decision inputs can be converted into node-edge graph representations. As shown, the three-dimensional structure 200a can be represented as a node-edge graph 200b. The geometric entities of structure 200a may be represented as nodes in graph 200b, and the constraints imposed on structure 200a may be represented as edges in graph 200b. For example, the geometric entities Point 1, Plane 1, Plane 2 and Plane 3 in structure 200a are represented as the nodes in graph 200b. The edges in graph 200b describe the constraints or limitations imposed on the structure 200a, or the relationships between the nodes. As illustrated by graph 200b, Point 1 is constrained to be located on Plane 1, Plane 2 and Plane 3, while Plane 1, Plane 2 and Plane 3 are constrained to be perpendicular to each other.

At step 104 (as mentioned earlier), certain of the received input decision-drivers can also be expressed as mathematical expressions (e.g., conditional equations, inequality equations, equality equations, difference equations, etc.). For example, a received input including an equality relation between the size of a particular pin and the size of the hole needed to accept the pin may be expressed mathematically as "Hole_Size=Pin_Size+5 mm". Also, for example, a received input including an inequality relation as to the cost of a part may be expressed mathematically as "Total_Cost<1000 dollars". A received input including a conditional relation for a part may be expressed mathematically, for example, as: "if Loading_Capacity>X, use Roller_Bearing, else use Ball_Bearing". In other words, the geometric entities for such received inputs may be represented as variables, and the constraints and dimensions imposed may be represented as mathematical equations.

At step 106, after the received inputs are converted into a unified decision network (e.g., decision inputs now expressed as one large problem including graph representations and mathematical representations), the large problem can be decomposed into a group of smaller sub-problems. For example, a graph-theoretic algorithm may be applied to the one large problem in order to decompose it into a group of smaller sub-problems. For the mathematical representations of the large problem, a graph-theoretic algorithm (e.g., See Serrano, D., and Gossard, D. C., "Combining Mathematical Models With Geometric Models In CAE Systems," Proc. ASME Computer in Eng. Conf., Chicago, Ill., July 1986.) may be applied to match each mathematical equation with a unique variable to prevent over-constraining. After the equation-variable matching is completed, the dependency and coupling between all equations can be derived, which leads to the breakup of the total equation set into smaller groups. The smaller groups of equations can then be solved sequentially and efficiently using suitable computer-implemented solution techniques, for example, the Newton-Raphson computation method or the Modified Gram-Schmidt computation method.

Notably, although not a limitation on the scope of the invention, from a technical standpoint if using a numerical approach to solve the smaller groups of equations, it is important to consider performance of a singularity check of the numerical solutions in order to enhance solution accuracy and performance. In that regard, constraints that cause global singularity should be rejected. Also, the numerical solutions should be validated against physically infeasible situations such as, for example, a negative radius.

Figure 4:
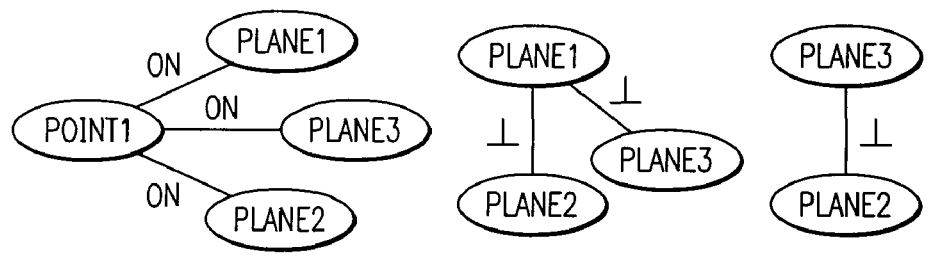
FIG. 4 illustrates how a graph can be decomposed into a set of algebraically solvable components.

In order to decompose the graph representations of the large problem into a group of smaller sub-problems, the structure of the node-edge graph may be analyzed. An analysis of the graph's structure shows (e.g., see graph 200*b*) that certain of the nodes may be considered terminal nodes, because all of the edges incident upon them can be used to drive those nodes. In other words, the graph may be decomposed and thus simplified by removing terminal nodes from the graph. As such, a node and its connecting edges may be removed from a graph, if the total number of degrees of freedom of the edges is less than or equal to that of the node. For example, in graph 200*b*, node Point 1 is incident on three planes, which generally provides a stable solution. Consequently, for decomposition purposes, node Point 1 and all three incident edges can be removed from graph 200*b*. FIG. 4 illustrates how graph 200*b* can be decomposed into a set of algebraically solvable components, by removing a set of terminal nodes (e.g., Point 1, Plane 1, Plane 3, Plane 2) from graph 200*b*.

At step 108, as part of the large, unified problem decomposition process, certain algorithms (e.g., graph-matching algorithms, Tarjan's algorithm, tri-connectivity algorithms, etc.) may be applied to the algebraically solvable sub-problems in order to detect the strongly-connected components (e.g., coupling between the different equations). Notably, tri-connected graphs include exactly three paths between any pair of distinct vertices. Consequently, tri-connectivity algorithms may be suitable to use for ordering graph sub-problems, because most problems encountered in industry are not highly coupled (e.g., 2 or 3 couples at the most).

At step 110, once the decomposition process is completed and the set of smaller sub-problems has been identified, a dependency propagation technique may be used to place the sub-problems in a proper order so that they can be sequentially and correctly processed and solved. In general, dependency propagation is a relational technique that records the relationships between the dimensions or parameters of the sub-problems, and then maintains these relationships as the dimensions or parameters are changed. For example, using dependency propagation to order the algebraically solvable components (FIG. 4) of the graph 200*b* shown in FIG. 3, a solution sequence for graph 200*b* can be (maintaining the relationships or dependencies between components): Plane 2→Plane 3; Plane 3→Plane 1; and Plane 1→Point 1. As a result of the decomposition process, an ordered list of small problems (e.g., 2 or 3 relations) is thus ready to be solved. Notably, for an overall decision in a practical industry environment, there may be thousands of these groups of small problems (e.g., 2 or 3 simultaneous relations per group) that need to be solved.

At step 112, each group of small problems can be solved sequentially and a group at a time. For example, a numerical solution algorithm (e.g., implemented in software) may be used to solve the purely numerical relations problems, an algebraic solution algorithm may be used to solve the purely geometric relations problems, and a logical inference algorithm may be used to solve the purely logical relations problems sequentially in accordance with the listed order.

At step 114, once an attempt has been made to solve the entire, ordered list of sub-problems, any sub-problem that may not be solved (e.g., a conflict exists), if any, may be identified. At step 116, if any such sub-problem is identified, the input or decision-driver related to that sub-problem may be re-specified at step 118, and the present method can return to step 104 to re-process that re-defined input. Otherwise, at step 120, an overall decision may be reported as complete. The integrated decision support method 100 may be re-iterated with new or re-specified inputs until a complete problem is deemed solved.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for integrated decision support, comprising the steps of:

receiving a plurality of decision inputs by a system having at least a hardware processor;

converting a first plurality of said received decision inputs to a plurality of graph representations by the system;

converting a second plurality of said received decision inputs to a plurality of mathematical representations by the system;

decomposing, by the system, said converted first plurality of said received decision inputs and said converted second plurality of said received decision inputs to a plurality of sub-problems;

detecting, by the system, a plurality of strongly-connected components associated with said plurality of sub-problems, each of said plurality of strongly-connected components representing a connection between at least two of said plurality of sub-problems; and solving said plurality of sub-problems by the system.

2. The method of claim 1, wherein the decomposing step further comprises the steps of:
performing dependency propagation for said plurality of sub-problems; and
placing said plurality of sub-problems in at least one pre-defined order for solution.

3. The method of claim 1, wherein the detecting step comprises executing a graph-theoretic algorithm for a plurality of mathematical equations associated with said plurality of strongly-connected components to prevent over-constraining.

4. The method of claim 1, wherein the decomposing step comprises decomposing said converted first plurality of said received decision inputs and said converted second plurality of said received decision inputs to a plurality of mathematical equations and algebraically solvable graph components.

5. The method of claim 1, wherein the detecting step comprises detecting a plurality of coupled dependency relations within said plurality of sub-problems.

6. The method of claim 1, wherein the detecting step comprises identifying a plurality of simultaneous equations within said plurality of sub-problems.

7. The method of claim 1, wherein the solving step comprises solving a plurality of numerical sub-problems and a plurality of algebraic sub-problems.

8. The method of claim 1, wherein said solving step comprises:
solving a plurality of numerical relations sub-problems with a numerical solution algorithm;
solving a plurality of geometric relations sub-problems with an algebraic solution algorithm; and
solving a plurality of logical relations sub-problems with a logical inference solution algorithm.

9. The method of claim 1, wherein said plurality of decision inputs comprises at least one of:
a plurality of option selection parameters;
a plurality of equality relation parameters;
a plurality of dependency parameters;
a plurality of production rule parameters;
a plurality of logical relation parameters;
a plurality of inequality expression parameters; and
a plurality of geometric constraint parameters.

10. The method of claim 1, wherein the solving step comprises solving a plurality of simultaneous equations with a Newton-Raphson algorithm or Modified GramSchmidt algorithm.

11. A non-transitory computer-readable medium storing software that when executed is operable to cause a processor to perform the steps of:
receive a plurality of decision inputs;
convert a first plurality of said received decision inputs to a plurality of graph representations;
convert a second plurality of said received decision inputs to a plurality of mathematical representations;
decompose said converted first plurality of said received decision inputs and said converted second plurality of said received decision inputs to a plurality of sub-problems;
detect a plurality of strongly-connected components associated with said plurality of sub-problems, each of said plurality of strongly-connected components representing a connection between at least two of said plurality of sub-problems;
and solve said plurality of sub-problems.

12. A computer-implemented system for integrated decision support, comprising:
a processor; and
a data storage device coupled to said processor, said processor operable to: receive a plurality of decision inputs;
convert a first plurality of said received decision inputs to a plurality of graph representations;
convert a second plurality of said received decision inputs to a plurality of mathematical representations;
decompose said converted first plurality of said received decision inputs and said converted second plurality of said received decision inputs to a plurality of sub-problems; detect a plurality of strongly-connected components associated with said plurality of sub-problems, each of said plurality of strongly-connected components representing a connection between at least two of said plurality of sub-problems; and
solve said plurality of sub-problems.

13. The system of claim 12, wherein said processor is further operable to:
perform dependency propagation for said plurality of sub-problems; and
place said plurality of sub-problems in at least one pre-defined order for solution.

14. The system of claim 12, wherein said processor is further operable to execute a graph-theoretic algorithm for a plurality of mathematical equations associated with said plurality of strongly-connected components to prevent over-constraining.

15. The system of claim 12, wherein said processor is further operable to decompose said converted first plurality of said received decision inputs and said converted second plurality of said received decision inputs to a plurality of mathematical equations and algebraically solvable graph components.

16. The system of claim 12, wherein said processor is further operable to detect a plurality of coupled dependency relations within said plurality of sub-problems.

17. The system of claim 12, wherein said processor is further operable to identify a plurality of simultaneous equations within said plurality of subproblems.

18. The system of claim 12, wherein said processor is further operable to solve a plurality of numerical sub-problems and a plurality of algebraic sub-problems.

19. The system of claim 12, wherein said processor is further operable to:
solve a plurality of numerical relations sub-problems with a numerical solution algorithm;
solve a plurality of geometric relations sub-problems with an algebraic solution algorithm; and
solve a plurality of logical relations sub-problems with a logical inference solution algorithm.

20. The system of claim 12, wherein said plurality of decision inputs comprises at least one of:
a plurality of option selection parameters;
a plurality of equality relation parameters;
a plurality of dependency parameters;
a plurality of production rule parameters;
a plurality of logical relation parameters;
a plurality of inequality expression parameters; and
a plurality of geometric constraint parameters.

21. The system of claim 12, wherein said processor is further operable to solve a plurality of simultaneous equations with a Newton-Raphson algorithm or Modified Gram-Schmidt algorithm.

22. A system for integrated decision support, comprising:
means for receiving a plurality of decision inputs;
means for converting a first plurality of said received decision inputs to a plurality of graph representations;

means for converting a second plurality of said received decision inputs to a plurality of mathematical representations;

means for decomposing said converted first plurality of said received decision inputs and said converted second plurality of said received decision inputs to a plurality of sub-problems;

means for detecting a plurality of strongly-connected components associated with said plurality of sub-problems, each of said plurality of strongly-connected components representing a connection between at least two of said plurality of sub-problems; and means for solving said plurality of sub-problems.

* * * * *